(12) United States Patent
Cross et al.

(10) Patent No.: US 9,135,594 B2
(45) Date of Patent: Sep. 15, 2015

(54) AMBIENT PROJECT MANAGEMENT

(75) Inventors: Charles W. Cross, Wellington, FL (US); Brian D. Goodman, Brooklyn, NY (US); Frank L. Jania, Chapel Hill, NC (US); Darren M. Shaw, Hursley (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2133 days.

(21) Appl. No.: 12/125,965

(22) Filed: May 23, 2008

(65) Prior Publication Data

US 2009/0292580 A1 Nov. 26, 2009

(51) Int. Cl.
*G06Q 10/06* (2012.01)
*G06Q 10/10* (2012.01)

(52) U.S. Cl.
CPC .. *G06Q 10/063114* (2013.01); *G06Q 10/06312* (2013.01); *G06Q 10/06313* (2013.01); *G06Q 10/103* (2013.01); *G06Q 10/06* (2013.01)

(58) Field of Classification Search
None
See application file for complete search history.

(56) References Cited

U.S. PATENT DOCUMENTS

| | | | | |
|---|---|---|---|---|
| 5,537,524 | A * | 7/1996 | Aprile | 345/440 |
| 6,240,395 | B1 * | 5/2001 | Kumashiro | 705/7 |
| 6,282,514 | B1 * | 8/2001 | Kumashiro | 705/7 |
| 6,854,088 | B2 * | 2/2005 | Massengale et al. | 705/7 |
| 2003/0225602 | A1 * | 12/2003 | Hagmann et al. | 705/7 |
| 2004/0002885 | A1 * | 1/2004 | Levy | 705/8 |
| 2004/0030590 | A1 * | 2/2004 | Swan et al. | 705/7 |
| 2005/0289503 | A1 * | 12/2005 | Clifford | 717/101 |
| 2008/0027791 | A1 * | 1/2008 | Cooper | 705/11 |
| 2009/0216587 | A1 * | 8/2009 | Dwivedi et al. | 705/7 |
| 2009/0222299 | A1 * | 9/2009 | Clemenson et al. | 705/9 |

FOREIGN PATENT DOCUMENTS

WO WO 2006087730 A1 * 8/2006
WO WO 2007120981 A2 * 10/2007

OTHER PUBLICATIONS

Parnin et al., "Design Guidelines for Ambient Software Visualization in the Workplace," 2007, IEEE, VISSOFT, pp. 18-25.*
Ripley et al., "Using Visualizations to Analyze Workspace Activity and Discern Software Project Evolution," Jan. 2006, ISRT Technical Report # UCI-IRS-06-1.*
Sarma et al., "Palantir: Raising Awareness among Configuration Management Workspaces," 2003, IEEE, Proceedings of the 25th International Conference on Software Engineering.*
Belotti et al., "Taskmaster: Recasting email as task management," Nov. 16, 2002, Position paper for CSCW 2002 workshop Re-designing Email for the 21st Century; New Orleans, Louisiana.*

(Continued)

*Primary Examiner* — Ivan R Goldberg
(74) *Attorney, Agent, or Firm* — Cuenot, Forsythe & Kim, LLC

(57) ABSTRACT

A computer-implemented method of ambient ad hoc project management can include defining a project and associating a project decay function with the project, wherein the project decay function regulates a rate at which project health declines. Responsive to detecting a project event, one or more parameters of the project decay function can be determined from the project event. Project health can be calculated according to the project decay function using the parameter(s). An indication of the project health can be output.

20 Claims, 2 Drawing Sheets

(56) References Cited

OTHER PUBLICATIONS

Heyblog, "Thoughts on Dashboard and Ambient Information", <http://www.heyotwell.com/heyblog/archives/2005/05/thoughts_on_das.html>, May 7, 2005 (last visited May 9, 2008).

Hermann et al., "The Tangible Reminder", 3rd IET International Conference on Intelligent Environments, pp. 144-151, Sep. 24-25, 2007.

Tamagotchi Connections, Product instructions v. 4.5, <http://www.tamagotchi.com/pdf/tama_v45_instructions.pdf> (last visited May 23, 2008).

Webkinz, <http://www.webkinz.com/us_en/> (last visited May 23, 2008).

* cited by examiner

AMBIENT PROJECT MANAGEMENT

BACKGROUND OF THE INVENTION

The embodiments of the present invention relate to project management and, more particularly, to ambient project management. The need to track multiple tasks within work and home environments can be daunting. When these tasks involve a specific set of activities to meet a goal or objective, each task may be considered a project. Since projects can include a wide variety of workplace tasks as well as home and leisure activities, monitoring and overseeing these projects can be difficult and cumbersome. A project can be as simple as organizing a birthday party or as complex as creating a five year plan for a corporation. Further, each project will have a differing level of importance as well as different deadlines and milestones.

As a particular project increases in importance, or nears completion, it can distract attention from lesser projects. The loss of attention can lead to neglect of these lesser projects. This neglect can be especially prevalent with smaller projects, containing fewer time restrictions and/or milestones.

BRIEF SUMMARY OF THE INVENTION

The embodiments disclosed herein relate to project management. One embodiment of the present invention can include a computer-implemented method of ambient, ad hoc project management. The method can include defining a project and associating a project decay function with the project, wherein the project decay function regulates a rate at which project health declines. Responsive to detecting a project event, one or more parameters of the project decay function can be determined from the project event. Project health can be calculated according to the project decay function using the parameter(s). An indication of the project health can be output.

Another embodiment of the present invention can include a computer-implemented method of ambient, ad hoc project management. The method can include defining a project, wherein the project is associated with a plurality of users, and defining a project decay function. The project decay function, which can depend upon project events, can be associated with the project. The method also can include detecting a project event associated with at least one of the plurality of users. A project health indicator can be determined. The project health indicator can be calculated using the project decay function and an indication of the project health indicator can be output.

Yet another embodiment of the present invention can include a computer program product including a computer-usable medium having computer-usable program code that, when executed, causes a machine to perform the various steps and/or functions described herein.

DETAILED DESCRIPTION OF THE INVENTION

Figure 1:
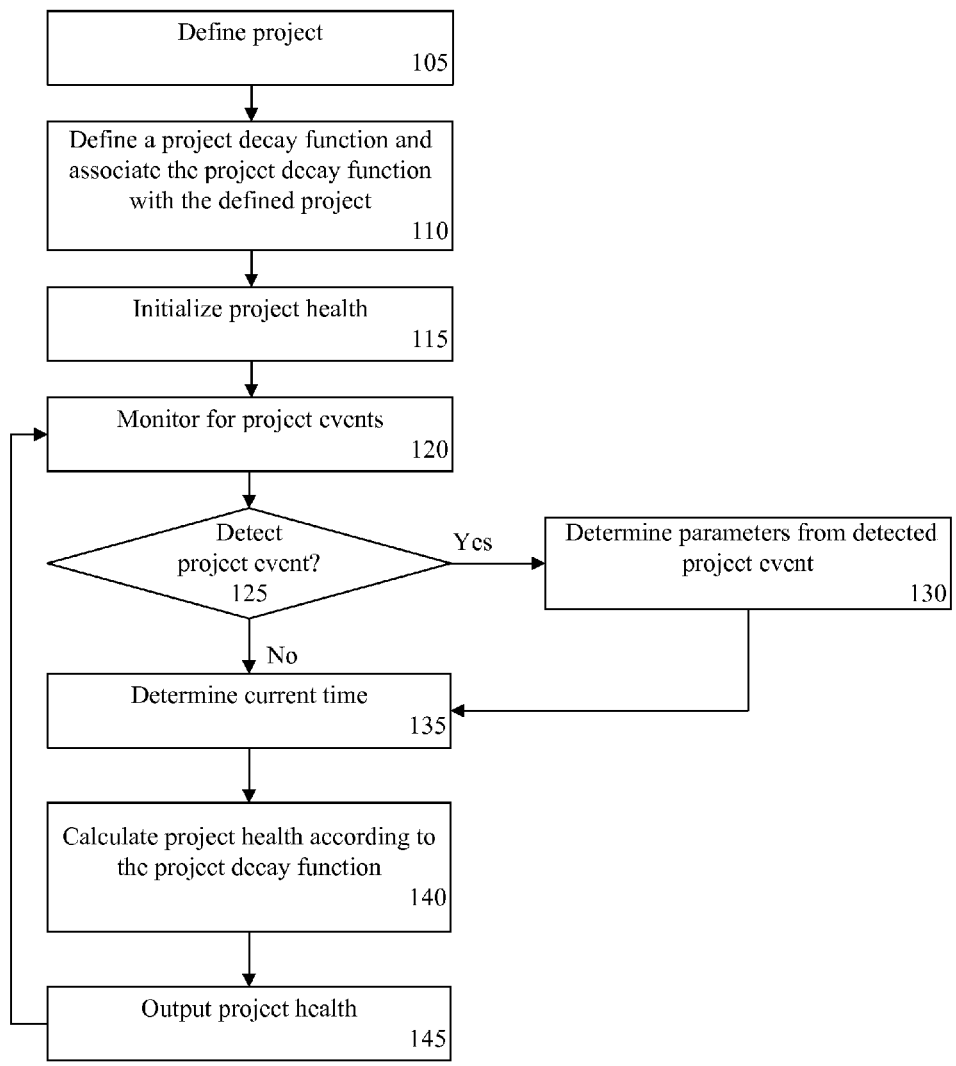
FIG. 1 is a flow chart illustrating a method of project management in accordance with one embodiment of the present invention.

As will be appreciated by one skilled in the art, the present invention may be embodied as a method, system, or computer program product. Accordingly, the present invention may take the form of an entirely hardware embodiment, an entirely software embodiment, including firmware, resident software, micro-code, etc., or an embodiment combining software and hardware aspects that may all generally be referred to herein as a "circuit," "module," or "system."

Furthermore, the invention may take the form of a computer program product accessible from a computer-usable or computer-readable medium providing program code for use by, or in connection with, a computer or any instruction execution system. For the purposes of this description, a computer-usable or computer-readable medium can be any apparatus that can contain, store, communicate, propagate, or transport the program for use by, or in connection with, the instruction execution system, apparatus, or device.

Any suitable computer-usable or computer-readable medium may be utilized. For example, the medium can include, but is not limited to, an electronic, magnetic, optical, electromagnetic, infrared, or semiconductor system (or apparatus or device), or a propagation medium. A non-exhaustive list of exemplary computer-readable media can include an electrical connection having one or more wires, an optical fiber, magnetic storage devices such as magnetic tape, a removable computer diskette, a portable computer diskette, a hard disk, a rigid magnetic disk, a magneto-optical disk, an optical storage medium, such as an optical disk including a compact disk-read only memory (CD-ROM), a compact disk-read/write (CD-R/W), or a DVD, or a semiconductor or solid state memory including, but not limited to, a random access memory (RAM), a read-only memory (ROM), or an erasable programmable read-only memory (EPROM or Flash memory).

A computer-usable or computer-readable medium further can include a transmission media such as those supporting the Internet or an intranet. Further, the computer-usable medium may include a propagated data signal with the computer-usable program code embodied therewith, either in baseband or as part of a carrier wave. The computer-usable program code may be transmitted using any appropriate medium, including but not limited to the Internet, wireline, optical fiber, cable, RF, etc.

In another aspect, the computer-usable or computer-readable medium can be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In accordance with the embodiments herein, a project can be defined and activities related to the project monitored. Based upon a project definition and detected project activities, the state or "health" of the project can be determined. This determination can produce a quantifiable measure of the health of the project which may be output. This output measure of health can be displayed in an ambient manner, imparting an intuitive understanding of the health of the project to a user.

The embodiments disclosed herein can be implemented within a project management application executing within a data processing system. The project management application may execute within a single data processing system or within a distributed environment within a plurality of data processing systems that may include a centralized server. Accordingly, the term "project management system" can refer to the project management application executing within one or more such data processing systems.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices, including but not limited to, keyboards, displays, pointing devices, etc., can be coupled to the data processing system either directly or through intervening I/O controllers. Network adapters may also be coupled to the data processing system to enable the data processing system to become coupled to other data processing systems or remote printers or storage devices through intervening private or public networks. Modems, cable modems, and Ethernet cards are just a few of the currently available types of network adapters.

FIG. 1 is a flow chart illustrating a method 100 of project management in accordance with one embodiment of the present invention. The method 100 can be implemented by a project management system as described herein. In general, the method 100 can monitor a defined project and output or generate an ambient indication of the health or success of the project using an ambient device. The term "ambient device," can refer to a class of device which uses the concept of pre-attentive processing to deliver information. Pre-attentive processing refers to the ability of the brain to process information in absence of direct attention by an individual. This processing of information can occur even while the individual is involved in a skilled task unrelated to the project for which an ambient indication is being provided.

When the ambient device is placed within an environment, the ambient device can impart useful information without creating distraction. The ambient device can intuitively communicate information via a change in size, color, position, motion, luminescence, perspective or the like. For example, an ambient clock can store calendar information and display appointment times of a user as darkened areas on the clock face. This intuitive approach can make the appointment information readily accessible to the user within the natural operation of glancing at the time on the clock. In this way, the ambient device can quickly convey an intuitive understanding of that state of a project to an individual.

Another example of an ambient device can include a display device that displays an icon or other visual representation of a project. The visual representation can be made to change shape, color, or the like as the health of the project changes over time. In this manner, users can be provided with relative information for the status of a project in a manner that does not distract from other activities. An ambient device also can include a peripheral device, such as a light or audio system, communicatively linked with a data processing system, e.g., one executing the project management system. Accordingly, some physical aspect of the peripheral device, e.g., sound volume, brightness of light, or the like, can be controlled to indicate the relative health of the project. Such a device further can include a touch sensor capable of detecting touch such that when a touch is detected, the touch is considered "attention" to a project that has been associated with the ambient indicator.

The method 100 can begin in step 105, where a project can be defined. As used herein, the term "project," can refer to a set of one or more tasks or activities with a specific set of goals and/or objectives, containing deadlines and/or milestones, which may be undertaken by an individual or a group of individuals. For example, a project can include an event requiring planning and/or resources, investigation of a topic or issue, a proposal or plan, or other activity.

In one embodiment, the project can be ad hoc. The term "ad hoc" refers to a project that is less formalistic, e.g., one with few or no milestones, but one that may still have a particular deadline for completion. The creation of an ad hoc project can result from a need to structure a set of tasks that may lack focus and/or attention, as opposed to developing a project according to a clearly defined institutional framework. For example, an ad hoc project can entail increasing product sales for an organization within a 30 day period. The tasks or processes for achieving the increase in sales may be minimally outlined, if at all. Still, a 30 day deadline can be clearly defined for the project. The deadline may be the only actual "deliverable" or date associated with the project.

The project can be defined in a number of ways. In one embodiment, the project can be manually defined by a user. The user can specify project parameters such as project tasks, project goals, project resources, project deadlines, assignment of project duties, and the like. In this manner the user can outline a timeline for the project, organize a structure for development of the project, and determine a metric for the "health" and success of the project. For example, an individual building a backyard deck can define a list of tasks related to the construction, deadlines to complete each task, building material required for the project, a construction budget, and a scheduling outline for contactors working on the project. Each of the preceding aspects of the deck construction project can be input by the user to establish the set of parameters that define the project.

In another embodiment, the project can be defined from a collection of tasks or smaller projects. For example, a homeowner may have a series of existing backyard tasks that can be combined and used to define a project called "backyard." The collection of tasks can be drawn from a single user or from a plurality of users, e.g., in a client-server project management application system.

In yet another embodiment the project can be defined automatically, wherein the behaviors or activities, e.g., computing activities, of one or more users can be monitored and used to suggest a project that encompasses the observed behavior. These activities being observed may involve a single user or a plurality of users. Activities, including, but not limited to, keyword searches performed by a user, frequent activities or word usages, electronic communications exchanged between a plurality of users, detecting multiple electronic messages between a plurality of users having like content or keywords (same or similar subject matter), repetitive calendar entries, Internet sites visited, frequent document or application usage, resources ordered or delivered, travel or scheduling information, or the like, can be monitored and detected. The project management system can observe such activities and suggest a project automatically. For example, observing electronic messages such as electronic mails or instant messages between a plurality of users with recurring keywords in the body text or in a subject heading, e.g., in the content of the electronic message, may cause the project management system to suggest a project directed to the observed communications or a keyword or words within such communications.

In another example, a user researching the purchase of a new automobile may initiate a series of Internet searches for vehicle reviews and automobile loan companies. A pattern relating to these searches can be discerned by the project management system and a project devoted to the new vehicle search can be automatically defined. The automatic definition may not create a complete definition, and as such may require additional user inputs to complete the project definition. For example, the project management system may request that the user specify a due date having already suggested the project. In this way, the project can be specified automatically, manually, or through a combination of automated suggestion and manual input.

In step 110, a project decay function can be defined and associated with the project. The term "project decay function," as used herein, can refer to a mathematical model or algorithm for calculating the health of the project, referred to as the "project health." The project decay function can be a simple or complex algorithm that can depend upon any of a variety of different project decay function parameters. The project decay function parameters can be determined from various project events including, but not limited to, time related project events, project type, project events that are internal to the project management system, and/or project events that are external to the project and/or project management system.

In one embodiment, the project decay function may be a time based function, e.g., depend upon time. Time, and the passage thereof, can be used to determine a fixed or variable decay rate for the project decay function. For example, the project health may decay at a predetermined rate of 10 percent per week, such that the project health degrades to zero after 10 weeks. In another example, the rate of decay of the project decay function can increase as a project deadline approaches or passes while remaining incomplete, encouraging greater interaction with, or updating of, the project within the project management system.

In further illustration, the project decay function can specify that the project health will decay faster or slower depending upon the time of year, time of day, or the like. For example, if a project is seasonal in nature, the project decay function can specify that the project health should decay faster during more important times of year, e.g., spring. The project will require greater attention during those times of the year in which the project health decays more rapidly than compared to other times of year with a rate of decay that is slower.

In another embodiment, the decay function can depend upon one or more parameters that are internal to either the project or the project management system. These internal parameters can be monitored or accessed by the project management system and used to update the project decay function. This monitoring and updating can occur automatically. Internal parameters can include, for example, the completion of a task associated with the project, an electronic communication having a key word associated with the project, an electronic communication detected between users associated with the project, ordering of resources needed for the project, or physical contact with a device that has been associated with the project, e.g., an ambient device or peripheral.

For example, the decay rate of the decay function can increase as a supply of a project resource that is tracked by the project management system decreases. The data for the project resource may be explicitly defined within the project or may be stored within a database or other application that may be communicatively linked with the project management system. In any case, the rate of decay can vary with the type of internal parameter, as each parameter within the project decay function may be weighted for importance. For example, the rate of decay can decrease as a particular project resource increases or the decay rate can increase as the number of members in the project is reduced.

In another embodiment the project decay function may be a function of external parameters. As with internal parameters, external parameters can be monitored or accessed by the project management system and used to update the project decay function. In this case, the project management system may require access to one or more data sources outside of the project management system or network of the organization in which the project management system operates. Examples of external parameters may include, but are not limited to, weather conditions, economic conditions or data, actions by competitive groups, actions by contract workers, materials shortages, communications or power outages, transportation issues, and the like. For example, an air conditioning parts manufacturing company may define a project wherein the decay rate of the project decay function increases as temperature increases. Increasing the rate of decay of the decay function can direct user attention to the need for increased parts inventory levels during episodes of hot or warm weather.

It should be noted that the date upon which the project decay function indicates a project health of zero may not coincide with the project deadline. For example, the project decay function may require weekly user input to prevent the project decay function from decreasing to zero. The project deadline, however, may be two months in the future. Making a time period for total decay of the project decay function shorter than the project deadline can assure more vigilant attention to the project by the user during the term of the project.

In step 115, the project health can be initialized. As noted, the project health refers to a metric or value calculated using the project decay function. The project health specifies the health, timeliness, progress, success, robustness, state, or the like, of a given project. In one embodiment, the project health can be initialized to a maximum value, where the project may begin in a healthy state. Alternatively, the project health can be initialized to a low value, or zero, to communicate that the project begins in a state of "poor health." The project health can be initialized to any value within the range of the highest possible project health to the lowest possible project health as determined according to the project decay function.

In step 120, the system can monitor for project events. As used herein, a "project event" can refer to any event or activity relating to time, an internal project parameter, and/or an external project parameter that can affect the state or health of the project. More particularly, a project event can be any event that can be detected by the project management system that influences the project health of the project as determined according to the project decay function.

In step 125, the system can determine whether a project event has been detected. If so, the method can proceed to step 130. If not, the method can continue to step 135. In step 130, one or more parameters from the detected project event can be determined. Each event can exert a different level of influence on the project health indicator per the specific role of the event within the project decay function. That is, each event can exert a different level of influence according to the particular parameters specified by the project event that are utilized by the project decay function.

In general, a project event that specifies internal parameters can be an event that occurs within a data processing system or systems that are part of the project management system, an event related to individuals associated with the project, an event associated with resources used by the project, or an event within an institution responsible for the project.

A project event specifying an internal parameter can include a detected keyword search related to the project, a detected electronic communication between project members (e.g. electronic mail or instant messaging (IM) sessions), a detected manipulation of objects or files related to the project or within the project, e.g., within a shared virtual workspace or file management system for the project, a detected completion of a project task, a detected group meeting and/or collaboration organized in conjunction with the project management system, a detected change in project membership (users associated with the project), an identified sales metric, a detected marketing result, an identified project cost and/or budgeting goal, a detected physical contact by the user with a project related device or system, or the like. For example, the project health can be adjusted each time an IM session occurs between project members, a contract is reached with a major vendor, a project member leaves the project, or a project task deadline is not met.

In one embodiment, an internal parameter of the project decay function that can be determined from detected events can be a level of collaboration between members of the project. For example, each group meeting between project members can increase the project health. A quantity of electronic mail, and/or a frequency and duration of IM sessions and/or messages, between project members can increase the project health by different amounts according to quantity, frequency and duration. In this example, the level of collaboration can be the primary parameter in determining the project health. Still, other project events may influence the project health such as sales results for a project, or a monetary or resource savings during the project.

It should be appreciated that project events such as interactions between project members can be monitored within an internal network server or monitored from sources outside the network. In other cases, electronic mail clients, telephony devices, and other devices that can interface with a client (e.g. personal computing devices, personal digital assistants, or a computing device dedicated to project tasks), mobile phone communications, or the like can be used to obtain information or detect project events. For example, a census worker can collect information for a census project on a personal digital assistant and later download the information onto a server processing the census data. The updating of that data when downloaded on the server may be detected as a project event if such data is utilized by the project decay function. In this way, internal parameters can be collected from the source, and/or on the device, external to the computing environment of the project management system and then imported into the project management system.

Project events that specify external parameters can refer to events that specify information obtained from outside the operational framework of the project such as data or applications outside of the data processing system(s) that implement the project management system, interaction with individuals outside of the project team, parameters relating to resources that influence the project without being directly consumed by the project, or parameters relating to outside institutions involved with the project. External parameters can influence the project outcome without being directly involved in project activities, resources, or individuals participating in the project. In order to monitor external parameters and/or external activities, the method 100 may access external networks or databases and use them to gather or update project information. Examples of an external parameter can include information obtained from an outside contractor or vendor, information describing external economic forces, weather conditions, political or social factors, natural disasters, losing or winning a customer contract, changes in resource costs, legal regulatory changes, or the like.

For example, a gardening project may experience four days of continual rain, delaying the start of a planting cycle; a freeze can kill plants; or a supplier may not deliver a fertilizer order. Each of the proceeding examples of external parameters can lead to an increase or decrease of the project health if incorporated into the project decay function. In another example, a project can be a bid for a military equipment contract which is later cancelled by changes in government budgeting. This external parameter can result in an immediate adjustment of the project health to zero and the "death" of the project.

Although a distinction has been made between internal and external parameters, the situation may arise where a clear distinction between internal and external parameters is difficult to discern. For example, a delivery driver for an external trucking company can upload daily delivery information from an electronic tablet, on which the driver records all deliveries, to a computing device of a project user. Data uploaded from the tablet may be related to the project and determined to be internal parameters as they represent project product delivered. The information, however, may be seen as external parameters as the delivery company is an institution existing outside of the project or the organization that maintains the project management system.

In step 135, the system can determine a current time. The current time can be used in a variety ways within the project decay function. Though described in terms of determining a current time, the passage of time or evaluation of time also may be considered the detection of a project event so long as the project decay function incorporates some aspect of time.

In one embodiment, time can be determined at a predetermined rate or time interval for the project decay function. For example, the loop defined by steps 120-140 can be executed every two seconds and the current time determined. In another embodiment, the detection of a project event in step 125 can initiate the determination of the current time. In yet another embodiment, both the detection of a project event and/or the passage of a predetermined amount of time can initiate the determination of the current time. For example, a user may be required to input a weekly status report to maintain the health of a project. Upon detecting the event of the weekly report being input, the project management system can determine the current time and whether the report was input during the one week time period. In addition, the project management system can implement steps 120-140 every 2 seconds, or at some other interval, determine from the current time the passage of the one week time period, and query another system to determine whether the status report has been delivered.

In step 140, the current time and other parameters obtained from the detected project events can be used in the project decay function to calculate, or determine, the project health. In one embodiment, as each project event is detected, the project health can be dynamically recalculated, or adjusted, according to the project decay function. In another embodiment, the updating of the project health can be performed in a periodic manner such as at a fixed time interval or responsive to a predetermined number of project events, e.g., more than one project event, being detected. In yet another embodiment, a combination of the preceding approaches can be implemented.

In step 145, the project health can be output. As used herein, "output" or "outputting" can include, but is not limited to, storing data in memory, e.g., writing to a file, writing to a user display or other output device such as an ambient device, playing audible notifications, sending or transmitting to another system, exporting, or the like.

The project can be associated with an icon and/or avatar graphically conveying information regarding the project health indicator. Accordingly, although the outputted project health is a quantitative value, the project health can be presented or graphically displayed as an icon or avatar on a display device, provided as an auditory output or indicated in any other form capable of communicating a change of the project health. A variation of the project health can be displayed by a change in appearance, e.g., size, color, position, motion, luminescence, perspective or the like, of the icon and/or avatar. In the case of an auditory output being associated with the project health, the volume, tone, and/or frequency of the auditory output can be changed to signal a variation in the project health.

For example, a gardening project can be represented as an avatar of a green plant that wilts and turns brown as the project health decreases. In another example, a birthday party project can be displayed as floating balloon which shrinks and sinks as party task deadlines pass. In another embodiment, a dedicated peripheral device can be used to indicate the project health. For example, a lighted globe which glows green when the project health indicator is maximized, but progressively changes color to red as the project health indicator deteriorates.

Figure 2:
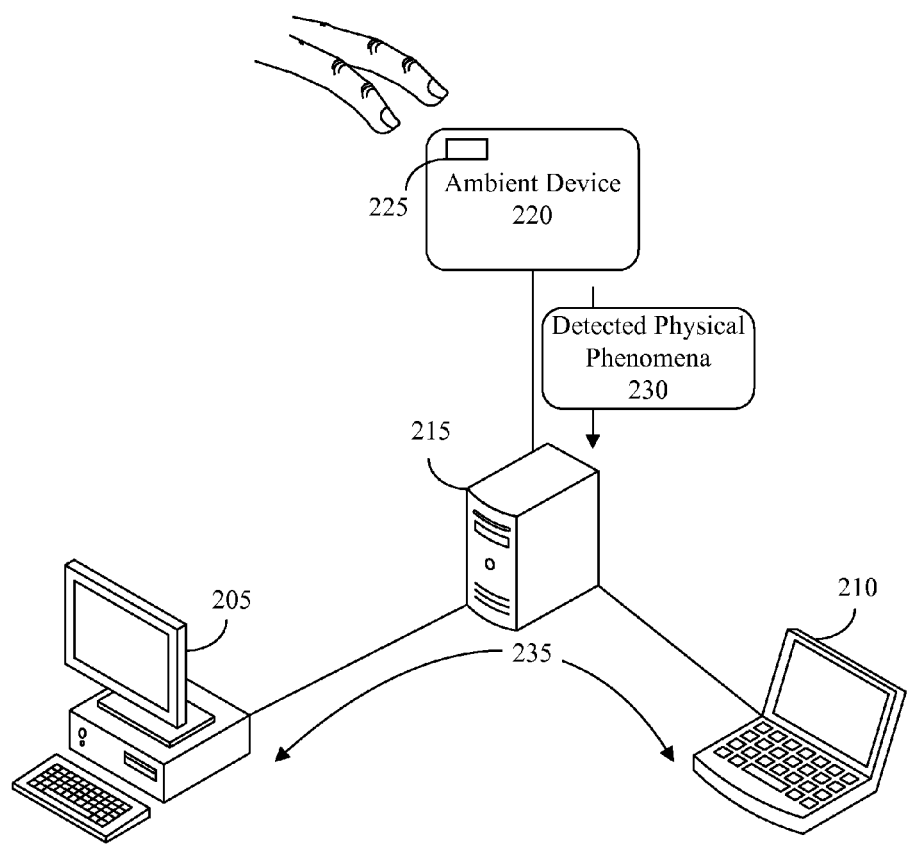
FIG. 2 is a block diagram illustrating a system for performing project management in accordance with another embodiment of the present invention.

FIG. 2 is a block diagram illustrating a system 200 for performing project management in accordance with another embodiment of the present invention. As shown, system 200 can include a computer system 205 and a computer system 210, each being communicatively linked through a server 215. As noted, each of the computer systems 205 and 210 can execute project management clients. Server 215 can execute a server side project management application. In this example, an ambient device 220 is coupled to the server 215. It should be appreciated, however, that the ambient device 220 can be coupled to one of the computer systems 205 or 210. Further, multiple ambient devices may be included so that each of computer systems 205 and 210 is coupled to an ambient device.

The ambient device 220 can include a biometric sensor 225. In one embodiment, the biometric sensor 225 can detect contact or touch from a user. For example, the biometric sensor 225 can be a capacitive device that outputs a signal or indicates that a user is in contact with the ambient device 220 responsive to detecting changing capacitances. Other examples of biometric sensors that can be used or included in the ambient device can include fingerprint sensors, olfactory sensors, heat detectors, retina scanners, radio frequency identification tag detectors, or the like.

As noted, the ambient device 220 can provide ambient indications of the health of a project. The ambient device 220, for example, may be a globe that changes color in a manner that correlates different colors with different levels of health for the project. The biometric sensor 225 allows various physical phenomena, e.g., touch, smell, contact from a particular individual using the fingerprint sensor, etc., to be correlated with or considered project events. Accordingly, different types of physical occurrences detected directly by the ambient device 220 can be provided to the project management application, e.g., the server 215 or one of the computer systems 205 or 210, to be used within the project decay function. That is, different types of physical phenomena that are detectable by the ambient device 220 can be incorporated into the project decay function.

Accordingly, any physical phenomena detected by ambient device 220 through the biometric sensor 225, e.g., physical phenomena 230, can be sent from the ambient device 220 to the project management application within server 215 in the form of an electronic message. The physical phenomena 230 can be incorporated into the project decay function, e.g., as another attribute influencing the health of the project.

In illustration, contact from one individual associated with the project may cause the health of the project to increase more than contact from a different individual that is also associated with the project. In another embodiment, different types of detected touch can be weighted differently or considered different types of physical phenomena. For example, multiple taps may have a different meaning or effect within the project decay function as compared to one longer and continuous contact. The number of taps may influence the project decay function differently. The length of time of a particular contact also may be a separate attribute. Similarly, particular smells may carry different weight or be weighted differently than other types of physical phenomena. This allows, for example, the ambient device 220 to be positioned in a location where the presence of particular smells, e.g., particular chemicals, has some meaning in terms of the project health, e.g., where a particular shipment of a chemical as a supply has arrived or been unloaded.

FIG. 2 also illustrates how different collaborations between two or more computer systems of users associated with a project can be detected. As shown, a collaboration 235 can be detected between computer system 205 and computer system 210. As noted, the collaboration 235 may be a text message, an electronic mail, a voice communication, or the like. The collaboration 235 may be detected by either computer system 205, 210 individually, both, or within the server 215. As noted, particular keywords of the collaboration 235 that are indicative, or identify, the project can be detected within the collaboration 235. In the case of voice communications, speech recognition can be used to detect particular keywords. In any case, as noted with respect to physical phenomena 230, collaborations between different persons can have different effects, e.g., weights, upon the health of a project according to the identity of the particular user or users that are communicating and/or the role of each user within the project, e.g., as project leader.

The flowchart(s) and block diagram(s) in the figures illustrate the architecture, functionality, and operation of possible implementations of systems, methods and computer program products according to various embodiments of the present invention. In this regard, each block in the flowchart(s) or block diagram(s) may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagram(s) and/or flowchart illustration(s), and combinations of blocks in the block diagram(s) and/or flowchart illustration(s), can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to the embodiments thereof, it will be apparent that modifications and variations are possible without departing from the scope of the invention defined in the appended claims.

What is claimed is:

1. A computer-implemented method of ambient ad hoc project management, the method comprising:
   defining a project;
   via a processor, associating a project decay function with the project, wherein the project decay function regulates a rate at which project health declines;
   via the processor, responsive to detecting a project event via a physical occurrence of a physical phenomena detected by a sensor of an ambient device, determining at least one parameter of the project decay function from the project event;
   calculating project health according to the project decay function using the at least one parameter; and
   via the processor, outputting an indication of the project health to the ambient device.

2. The computer-implemented method of claim 1, further comprising, via the processor, initializing the project health.

3. The computer-implemented method of claim 1, wherein defining a project further comprises, via the processor, a user defining the project.

4. The computer-implemented method of claim 1, wherein defining a project further comprises, via the processor, automatically defining the project.

5. The computer-implemented method of claim 4, wherein automatically defining the project further comprises, via the processor, automatically defining the project based upon at least one detected computing activity of a user.

6. The computer-implemented method of claim 1, further comprising, via the processor, selecting the project decay function to depend upon time.

7. The computer-implemented method of claim 1, further comprising, via the processor, selecting the project decay function to depend upon a level of collaboration detected between at least two users associated with the project.

8. The computer-implemented method of claim 1, further comprising, via the processor, selecting the project decay function to depend upon at least one project event specifying an internal parameter.

9. The computer-implemented method of claim 1, further comprising, via the processor, selecting the project decay function to depend upon at least one project event specifying an external parameter.

10. The computer-implemented method of claim 1, wherein outputting the project health further comprises:
    via the processor, displaying an avatar as a representation of the project health; and
    via the processor, altering an appearance of the avatar responsive to changes in the project health.

11. The computer-implemented method of claim 1, further comprising responsive to detecting the project event, via the processor, resetting the project health to a maximum value.

12. The computer-implemented method of claim 1, further comprising responsive to detecting the project event, via the processor, calculating a new value of the project health using the project decay function.

13. A computer-implemented method of ambient ad hoc project management, the method comprising:
    via a processor, defining a project, wherein the project is associated with a plurality of users;
    via the processor, defining a project decay function and associating the project decay function with the project, wherein the project decay function depends on project events;

via the processor, detecting at least one project event associated with at least one of the plurality of users via a physical occurrence of a physical phenomena detected by a sensor of an ambient device;

via the processor, determining project health, wherein the project health is calculated using the project decay function according to the at least one project event; and via the processor, outputting an indication of the project health to the ambient device.

14. The computer-implemented method of claim 13, further comprising, via the processor, selecting the project decay function to depend upon a level of collaboration between the plurality of users of the project.

15. The computer-implemented method of claim 13, wherein detecting a project event associated with at least one of the plurality of users further comprises, via the processor, detecting an electronic message exchanged between at least a first user of the plurality of users and at least a second user of the plurality of users, wherein the content of the electronic message relates to the project.

16. The computer-implemented method of claim 13, wherein outputting an indication of the project health further comprises, via the processor, modifying a physical property of a peripheral device responsive to changes in the project health.

17. The computer-implemented method of claim 13, wherein outputting the project health indicator further comprises:

via the processor, displaying an avatar as a representation of the project health; and via the processor, altering an appearance of the avatar responsive to changes in the project health.

18. A computer program product comprising:
a computer-readable storage device having stored thereon computer-usable program code that, when executed by a system comprising a processor and a memory, manages ad hoc projects, the computer-readable storage device comprising:

computer-usable program code that defines a project;

computer-usable program code that associates a project decay function with the project, wherein the project decay function regulates a rate at which project health declines;

computer-usable program code that, responsive to detecting a project event via a physical occurrence of a physical phenomena detected by a sensor of an ambient device, determines at least one parameter of the project decay function from the project event;

computer-usable program code that calculates project health according to the project decay function using the at least one parameter; and computer-usable program code that outputs an indication of the project health to the ambient device.

19. The computer program product of claim 18, wherein the computer-usable program code that defines the project further comprises computer-usable program code that automatically defines the project according to at least one detected computing activity of a user.

20. The computer program product of claim 18, wherein computer-usable program code that outputs the project health further comprises:

computer-usable program code that displays an avatar as a representation of the project health; and computer-usable program code that alters an appearance of the avatar responsive to changes in the project health.

* * * * *